(12) United States Patent
Buckwalter et al.

(10) Patent No.: US 8,763,337 B2
(45) Date of Patent: Jul. 1, 2014

(54) TRANSITION STRIP FOR FLOOR PANEL AND METHOD OF INSTALLATION, REPLACEMENT, AND REPAIR USING THE SAME

(75) Inventors: Michael E. Buckwalter, New Providence, PA (US); Michael T. Pham, Columbia, PA (US)

(73) Assignee: AWI Licensing Company, Wilmington, DE (US)

( * ) Notice: Subject to any disclaimer, the term of this patent is extended or adjusted under 35 U.S.C. 154(b) by 590 days.

(21) Appl. No.: 12/859,840

(22) Filed: Aug. 20, 2010

(65) Prior Publication Data

US 2012/0042602 A1 Feb. 23, 2012

(51) Int. Cl.
*E02D 37/00* (2006.01)
*E04G 23/00* (2006.01)

(52) U.S. Cl.
USPC .......................................... 52/514; 52/506.01

(58) Field of Classification Search
USPC .............................................. 52/506.01, 514
See application file for complete search history.

(56) References Cited

U.S. PATENT DOCUMENTS 5,366,775 A * 11/1994 Kao .............................. 428/41.5
5,591,498 A * 1/1997 Arakawa ...................... 428/40.1
6,189,279 B1 * 2/2001 Fiechtl ......................... 52/403.1
6,231,962 B1 * 5/2001 Bries et al. .................. 428/317.3
7,182,988 B2 * 2/2007 McCain ....................... 428/40.2
2005/0055976 A1 * 3/2005 Pacione ...................... 52/745.19
2010/0247834 A1 9/2010 Balmer et al.
2012/0042602 A1 * 2/2012 Buckwalter et al. ......... 52/741.1

OTHER PUBLICATIONS

Konecto Installation Manual 2010, Apr. 7, 2010, pp. 1-11.
Lowe's Home Center, Inc.'s "Surface Source" Point-of-Sale Materials, Available Nov. 2008.

* cited by examiner

*Primary Examiner* — Andrew J Triggs

(74) *Attorney, Agent, or Firm* — Amy M. Fernandez

(57) ABSTRACT

A transition strip is used to install, replace, and repair a floor panel in a floating floor system. The transition strip is a film or tape that comprises plastic, vinyl, polyvinyl chloride, polyester, polyolefin, or nylon. The transition strip can be used to repair a floor panel by removing at least one of the floor panels in the floating floor system to form an opening therein. The transition strip is positioned in the opening such that a portion of a top side of the transition strip adheres to a bottom surface of a bottom layer of at least one floor panel adjacent the opening and a portion of a top side of the transition strip extends into the opening. A bottom surface of a bottom layer of a replacement floor panel is then adhered to the portion of the transition strip extending into the opening.

10 Claims, 12 Drawing Sheets

TRANSITION STRIP FOR FLOOR PANEL AND METHOD OF INSTALLATION, REPLACEMENT, AND REPAIR USING THE SAME

FIELD OF THE INVENTION

The present invention relates to a transition strip for a floor panel having a top layer offset from a bottom layer. The present invention further relates to a method of installing, replacing, and repairing a floor panel having a top layer offset from a bottom layer using a transition strip.

BACKGROUND OF THE INVENTION

Floor panels for use in floating floor systems typically comprise a top layer and a bottom layer adhered together in an offset relationship such that a substantially L-shaped marginal end portion of a top surface of the bottom layer and a substantially L-shaped marginal end portion of a bottom surface of the top layer are exposed. The top layer typically comprises at least one mix layer, a print film, a wear layer, and a top coat. The bottom layer typically comprises at least one mix layer. The bottom layer has a thickness about equal to or greater than the top layer. A ratio of a thickness of the top layer to a thickness of the bottom layer is typically in the range of about 2 or less. For example, the SURFACE SOURCE product sold by Lowe's Home Centers, Inc. has a top layer with a thickness of about 64 mils (about 1.63 millimeters), and a bottom layer with a thickness of about 61 mils (about 1.55 millimeters). Thus, the ratio of the thickness of the top layer to the bottom layer is about 1.05 (64 mils/61 mils=1.05).

In order to assemble the floating floor system, at least one of the marginal end portions of each of the floor panels is provided with an adhesive. The marginal end portion provided with the adhesive is engaged with the marginal end portion of an adjacent floor panel to form the floating floor system. Because the thickness of the bottom layer is significantly large (about 98 mils (about 2.5 millimeters)), installation, replacement, and repair of the floor panels can be difficult and labor intensive. For example, when the floor panels are installed, if a gap is formed between the ends of the bottom layers of the adjacent floor panels, the gap can telescope through the floor panels thereby significantly altering the aesthetic and structural characteristics of the top layer. Additionally, if the ends of the bottom layers of the adjacent Hoof panels are caused to overlap, the overlaps can additionally telescope through the floor panel thereby also significantly altering the aesthetic and structural characteristics of the top layer.

Additionally, in order to repair a floor panel in a floating floor system having the above-described characteristics, a cutting mechanism must be guided about the perimeter of the top layer. As the cutting mechanism is guided about the perimeter of the top layer, the cutting mechanism must be forced to additionally cut through the bottom layer of the floor panel. Because the bottom layer is a thick mix layer, cutting through the bottom layer is extremely difficult. The floor panel is then pried up and removed from the floating floor system to create an opening in the floating floor system. Because the bottom layer is cut in a position corresponding to the perimeter of the top layer, a portion of the bottom layer remains underneath the adjacent floor panels when the floor panel is removed from the floating floor system. Thus, due to the thickness of the bottom layer, the bottom layer remaining underneath the adjacent floor panels must be completely carved out before a replacement floor panel can be inserted into the opening and adhered to the adjacent floor panels.

In view of the foregoing, there still remains a need to develop a method of installing, replacing, and repairing floor panels that overcomes the above-described problems.

BRIEF SUMMARY OF THE INVENTION

The invention relates to a transition strip for installing, replacing, or repairing a floor panel in a floating floor system, comprising a film or tape comprising plastic, vinyl, polyvinyl chloride, polyester, polyolefin, or nylon, the transition strip having a thickness of about 1-60 mils.

The invention further relates to method of replacing a floor panel in a floating floor system comprising a plurality of floor panels having a top layer with an exposed marginal end portion and a bottom layer with an exposed marginal end portion, the marginal end portion of the top layer being adhered to the marginal end portion of the bottom layer of the adjacent floor panel, the method comprising: removing at least one of the floor panels to form an opening in the floating floor system; positioning a transition strip in the opening such that a portion of a top side of the transition strip adheres to a bottom surface of the bottom layer of the floor panel adjacent the opening and a portion of the top side of the transition strip extends into the opening; and adhering a bottom surface of a bottom layer of a replacement floor panel to the portion of the transition strip extending into the opening.

DETAILED DESCRIPTION OF TILE EMBODIMENT(S)

Figure 1:
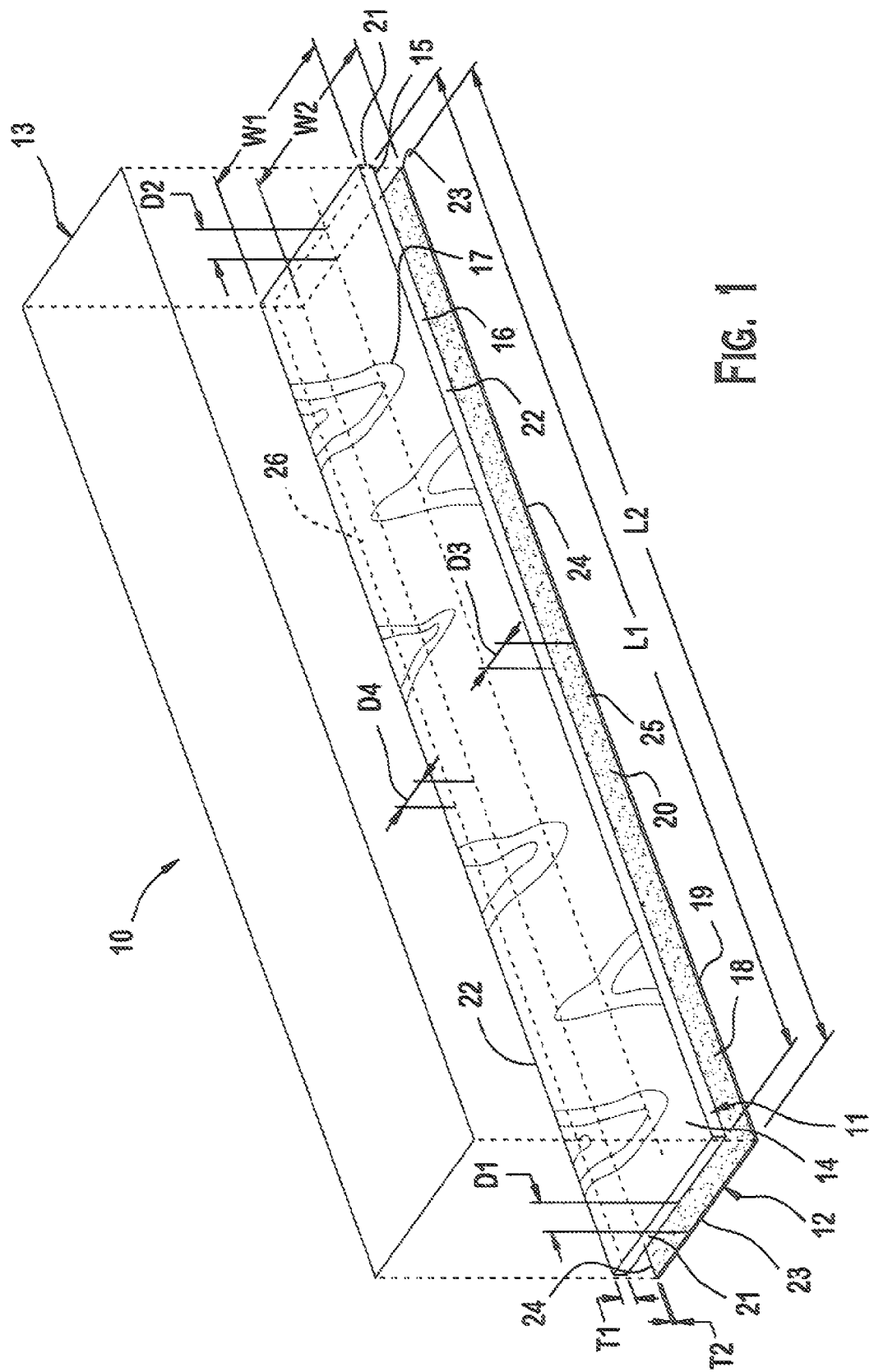
FIG. 1 is a partially exploded perspective view of a floor panel according to an embodiment of the invention.
Figure 2:
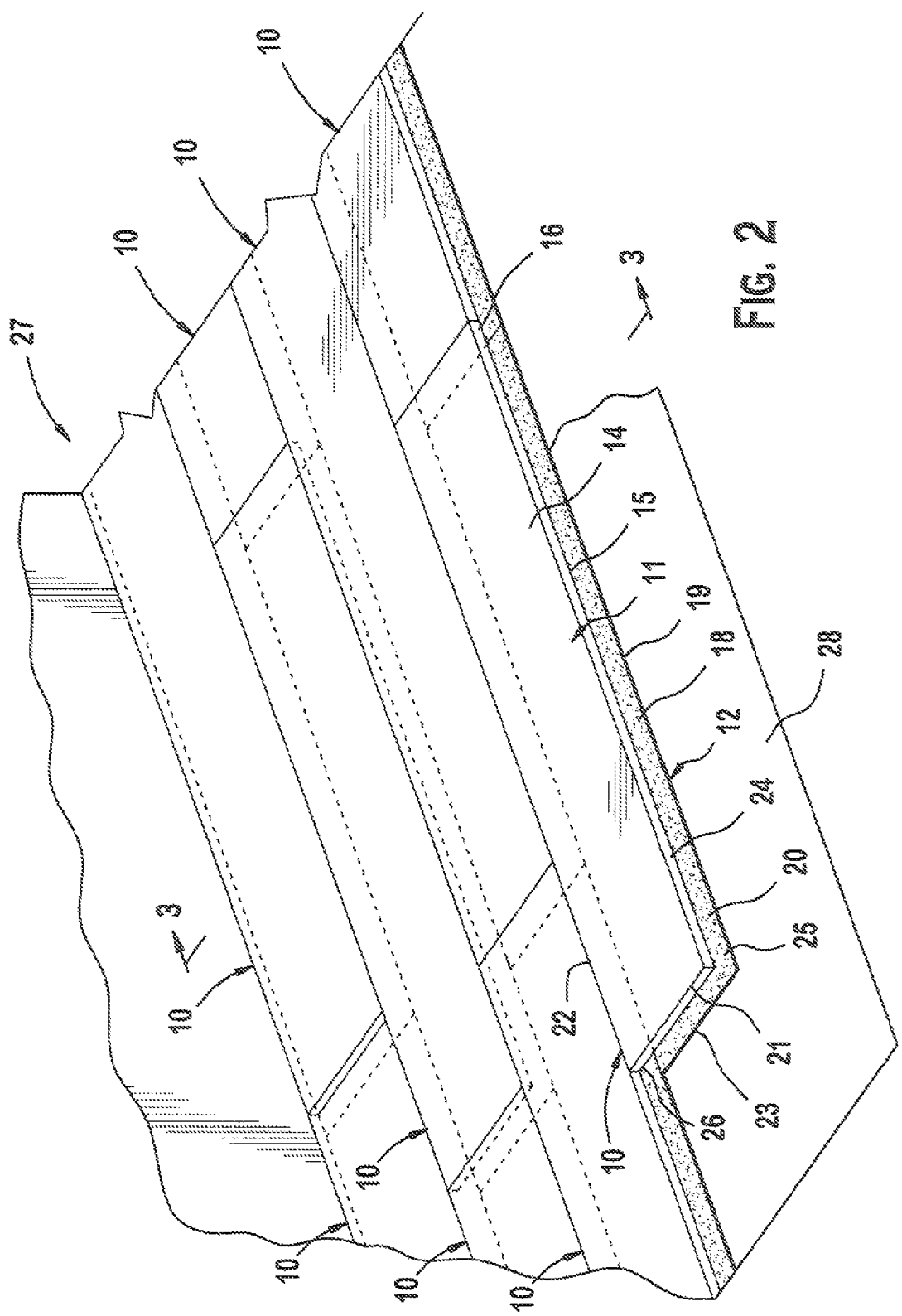
FIG. 2 is a perspective view of a floating floor system incorporating the floor panel of FIG. 1.
Figure 3:
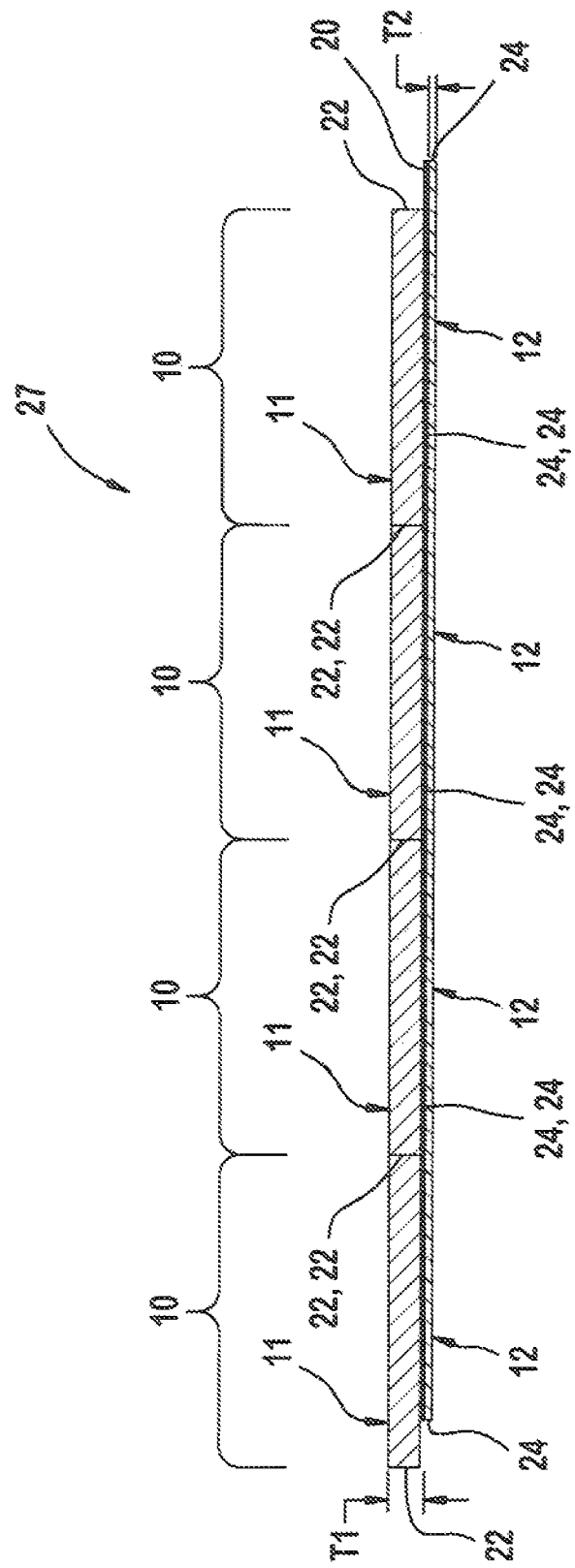
FIG. 3 is a sectional view taken along line 3-3 of FIG. 2.

FIGS. 1-3 show a floor panel 10 according to an embodiment of the invention. As shown in FIG. 1, the floor panel 10 comprises a top layer 11, a bottom layer 12, and a release member 13. The top layer 11 may be formed, for example, from a substantially flexible sheet material, such as plastic, vinyl, polyvinyl chloride, polyester, or combinations thereof. The top layer 11 has a top surface 14 with a visible decorative pattern 17 and a bottom surface 15. In the illustrated embodiment, the top layer 11 comprises at least one mix layer 16, a print film provided with the visible decorative pattern 17, a wear layer (not shown), and a top coat (not shown), respectively. It will be appreciated by those skilled in the art that although the top layer 11 is shown and described herein as comprising multiple layers that the top layer 11 may alternatively comprise a single layer. Additionally, the types of layers constituting the top layer 11 and the visible decorative pattern 17 could be varied depending on the desired characteristics of the top layer 11.

As shown in FIG. 1, the top layer 11 has a thickness T1 of about 20-200 mils (about 0.508-5.08 millimeters), preferably about 60-180 mils (about 1.524-4.572 millimeters), and more preferably about 80-150 mils (about 2.032-3.810 millimeters). In the illustrated embodiment, the top layer 11 is substantially rectangular in shape and has a length L1 of about 36 inches (about 91.4 centimeters) and a width W1 of about 6 inches (about 15.2 centimeters). However, it will be appreciated by those skilled in the art that the geometrical shape and the length L1 and the width W1 of the top layer 11 may be varied depending on the desired dimension and geometrical configuration of the floor panel 10. For example, the top layer 11 may alternatively have a substantially square shape.

As shown in FIG. 1, the bottom layer 12 has a top surface 18 and a bottom surface 19. The bottom layer 12 may be formed, for example, from a film or tape comprising plastic, vinyl, polyvinyl chloride, polyester, polyolefin, nylon, or combinations thereof. The bottom layer 12 may also include recycle material, such as post industrial or post consumer scrap. The film or tape may be rigid or flexible and is preferably moisture resistant or waterproof. Additionally, the film or tape may be capable of being delivered or shipped in a roll. In the illustrated embodiment, the bottom layer 12 comprises a single layer of rigid black polyvinyl chloride film. Alternatively, the bottom layer 12 could comprise multiple layers, such as two layers of film laminated with a mat, such as a glass mat or polyethylene terephthalate mat, there between. The bottom layer 12 could also be provided with at least one of a continuous or discontinuous ink layer, antimicrobial layer, sound deadening layer, cushioning layer, slide resistant layer, stiffening layer, channeling layer, mechanically embossed texture, or chemical texture.

As shown in FIG. 1, the bottom layer 12 has a thickness T2 less than the thickness T1 of the top layer 11. The thickness 12 of the bottom layer 12 is, for example, about 1-60 mils (about 0.0254-1.524 millimeters), preferably about 6.5-12 mils (about 0.1651-0.3048 millimeters), and more preferably about 8 mils (about 0.2032 millimeters). A ratio of the thickness T1 of the top layer 11 to the thickness T2 of the bottom layer 12 is about 5 or greater, preferably about 10-100, and more preferably about 10-25. The bottom layer 12 has a length L2 and a width W2 the same as the length L1 and the width W1 of the top layer 11. Thus, in the illustrated embodiment, the bottom layer 12 is substantially rectangular in shape and has the length L2 of about 36 inches (about 91.4 centimeters) and the width W2 of about 6 inches (about 15.2 centimeters). However, it will be appreciated by those skilled in the art that the geometrical shape and the length L1 and the width W1 of the bottom layer 12 may be varied depending on the desired dimension and geometrical configuration of the floor panel 10. For example, the bottom layer 12 may alternatively have a substantially square shape.

As shown in FIG. 1, the bottom surface 15 of the top layer 11 is laminated to the top surface 18 of the bottom layer 12 by an adhesive 20. The adhesive 20 may be, for example, any suitable adhesive, such as a hot melt adhesive, a pressure sensitive adhesive, or a structural and/or reactive adhesive. In the illustrated embodiment, the adhesive is a pressure sensitive acrylic adhesive. The adhesive 20 may have, for example, a bond strength of at least 25 force-pounds, and more preferably about 25-30 force-pounds after having been heat aged for about 24 hours at 145 degrees Fahrenheit. In the illustrated embodiment, the adhesive 20 is provided on substantially an entirety of the top surface 18 of the bottom layer 12. The adhesive 20 may be applied to have a thickness, for example, of about 1-2 mils (about 0.0254-0.0508 millimeters). It will be appreciated by those skilled in the art, however, that the thickness of the adhesive 20 may vary depending on the texture of the bottom surface 15 of the top layer 11 and the texture of the top surface 18 of the bottom layer 12 in that a substantially smooth surface would require less of the adhesive 20 due to better adhesion and bond strength.

The top layer 11 is adhered to the bottom layer 12 so that the top layer 11 is offset from the bottom layer 12 in a direction of the length L1, L2 and the width W1, W2. In other words, opposing first ends 21 of the top layer 11 are offset in the direction of the length L1, L2 from opposing first ends 23 of the bottom layer 12 an offset distance D1, D2 and opposing second ends 22 of the top layer 11 are offset in the direction of the width W1, W2 from opposing second ends 24 of the bottom layer 12 an offset distance D3, D4. The offset distances D1, D2, D3, D4 are substantially the same. In the illustrated embodiment, the offset distances D1, D2, D3, D4 are, for example, about 1 inch (about 2.5 centimeters). It will be appreciated by those skilled in the art, however, that the offset distances D1, D2, D3, D4 may be varied depending on the desired configuration of the floor panel 11. Examples of possible variations in the offset distances D1, D2, D3, D4 are set forth, for example, in U.S. patent application Ser. No. 12/412,419, filed Mar. 27, 2009, which is hereby incorporated by reference in its entirety. Because the adhesive 20 is provided on substantially the entirety of the top surface 18 of the bottom layer 12, due to the offset of the top layer 11 relative to the bottom layer 12, a substantially L-shaped marginal end portion of the top surface 18 of the bottom layer 12 remains exposed to form an adhesive surface 25, and a substantially L-shaped marginal end portion of the bottom surface 15 of the top layer 11 remains exposed to form an attachment surface 26.

As shown in FIG. 1, the release member 13 is positioned adjacent to the top surface 14 of the top layer 11 and the adhesive surface 25 to cover the adhesive surface 25 during shipping of the floor panel 10 and prior to the installation thereof. In the illustrated embodiment, the release member 13 is a flexible sheet corresponding in size and shape to the bottom layer 12. It will be appreciated by those skilled in the art, however, that the size and shape of the release member 13 may be varied, as long as the release member 13 adequately covers the adhesive surface 25. The release member 13 may be made, for example, from any known suitable release material, such as a poly or silicone coated paper, a plastic sheet, a polymer film, or other material that enables the release member 13 to be quickly and easily removed from the adhesive surface 25 during the installation of the floor panel 10.

FIGS. 2-3 show a floating floor system 27 comprising a plurality of the floor panels 10 installed on a sub-floor 28. Preferably, the installation of the floor panels 10 would start adjacent a wall and/or in a corner of a room and would proceed outwardly there from. As shown in FIG. 2, in order to install the floor panels 10, at least one of the floor panels 10 is arranged on the sub-floor 28 such that the bottom surface 19 of the bottom layer 12 is in contact with the sub-floor 28. The release member 13 is removed from the floor panel 10 to expose the adhesive surface 25 on the top surface 18 of the bottom layer 12. Another one of the floor panels 10 is then adhered to the adhesive surface 25 by engaging the attachment surface 26 on the bottom surface 15 of the top layer 11 with the adhesive surface 25. The process is repeated until the desired number of the floor panels 10 covers the sub-floor 28.

As shown in FIGS. 2-3, the floor panels 10 are installed such that the first ends 21, 23 of the top and bottom layers 11, 12 of the floor panels 10 substantially abut the first ends 21, 23 of the top and bottom layers 11, 12 of the adjacent floor panels 10, and the second ends 22, 24 of the top and bottom layers 11, 12 of the floor panels 10 substantially abut the second ends 22, 24 of the top and bottom layers 11, 12 of the adjacent floor panels 10. Because the thickness T2 of the bottom layer 12 of the floor panels 10 is significantly less than the thickness T1 of the top layer 11, when the adjacent floor panels 10 are engaged, any gaps or overlapping that may occur between the first and second ends 22, 23 of the bottom layers 12 of the adjacent floor panels 10 will not impact the aesthetic and/or structural characteristics of the top layer 11. Therefore, by reducing the thickness of the bottom layer 12, buckling at the top surface 18 of the top layer 11 can be prevented.

It will be appreciated by those skilled in the art that the method of installation of the floor panels 10 is not limited to the method shown and described herein. Examples of possible variations in the method of installation of the floor panels 10 are set forth, for example, in U.S. patent application Ser. No. 12/412,419, filed Mar. 27, 2009, which is hereby incorporated by reference in its entirety.

Figure 4:
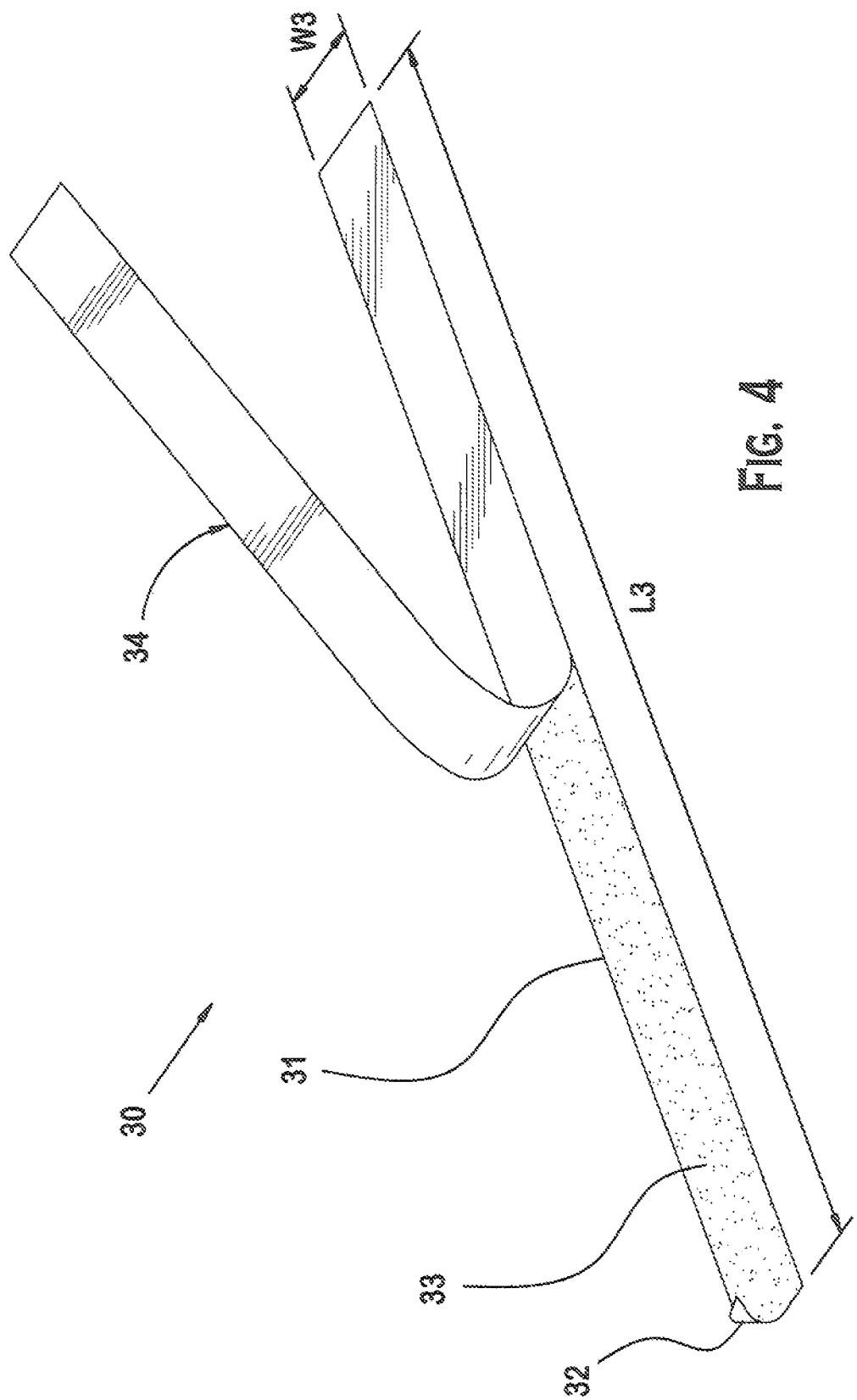
FIG. 4 is a partially exploded perspective view of a transition strip.
Figure 5:
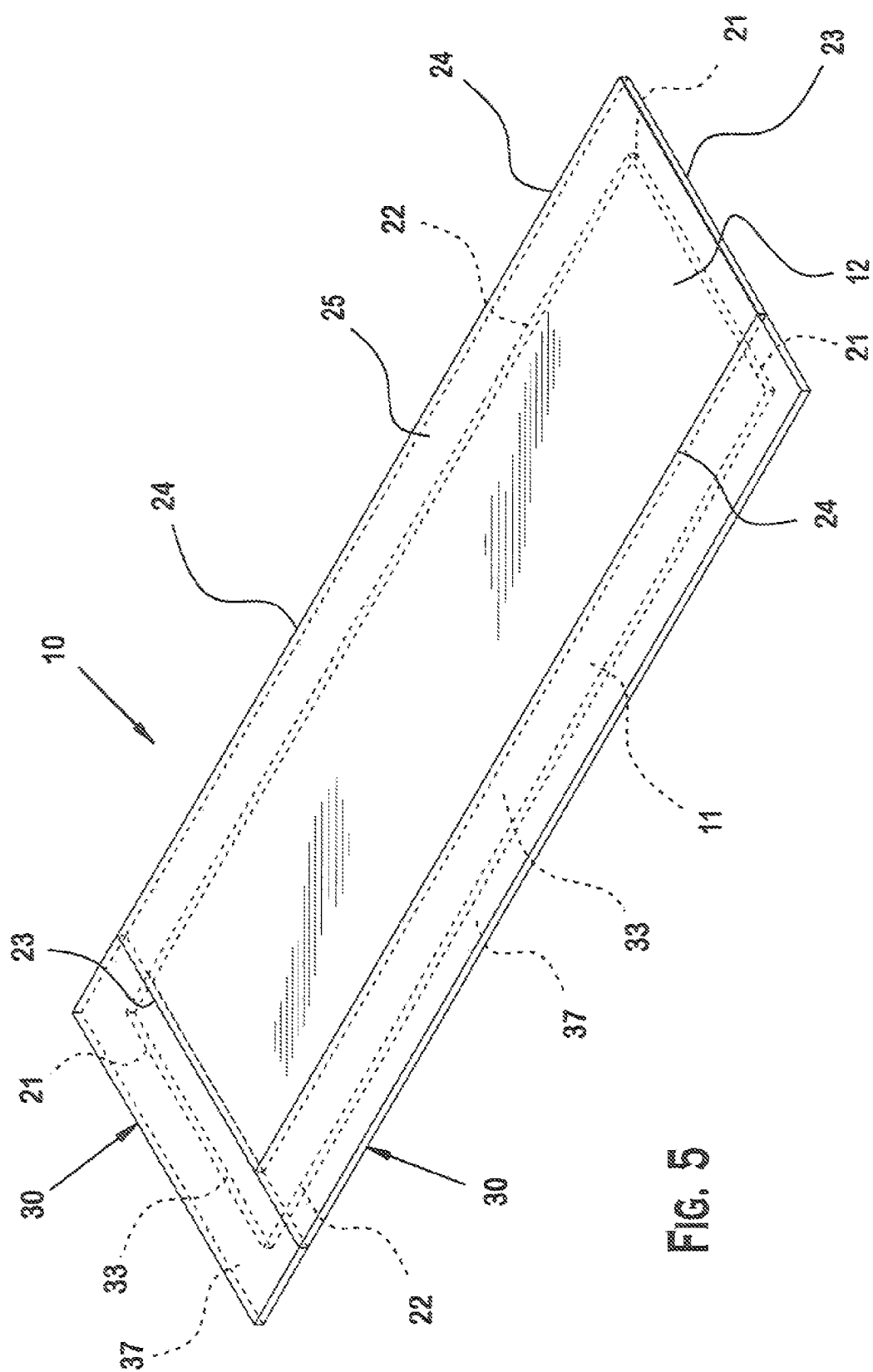
FIG. 5 is a bottom perspective view of the floor panel of FIG. 1 provided with the transition strip of FIG. 4.
Figure 6:
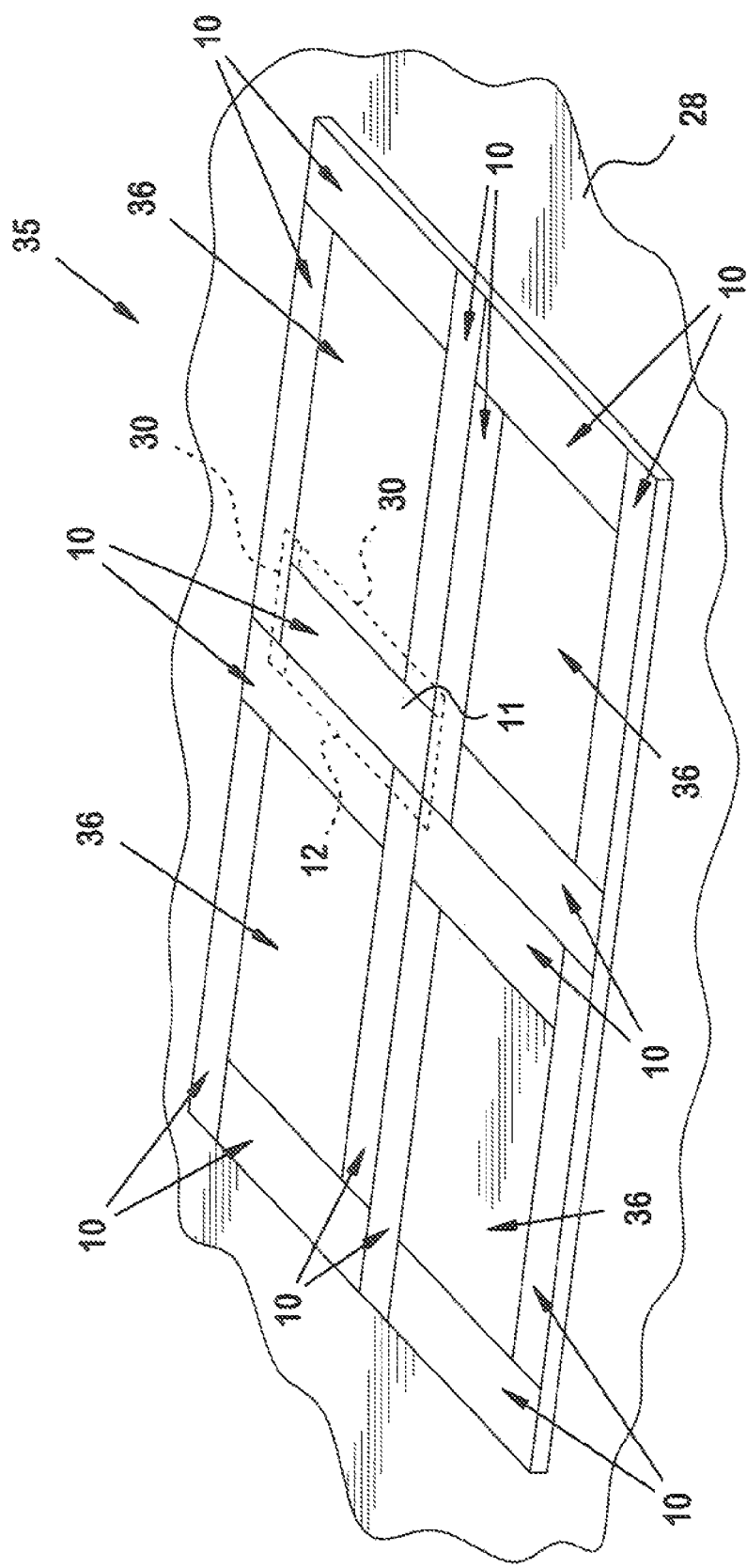
FIG. 6 is a perspective view of a mixed media floating floor system incorporating the floor panel of FIG. 5.

Additionally, it will be appreciated by those skilled in the art that the pattern of the floor panels 10 shown in FIG. 2 is just one of numerous possible patterns for installing the floor panels 10. For example, as shown in FIGS. 4-6, a transition strip 30 may be used to vary the pattern of installation of the floor panels 10 and/or used to include floor structures 36 having a composition and/or geometrical configuration different from the floor panels 10. As shown in FIG. 4, the transition strip 30 is a film or tape comprising plastic, vinyl, polyvinyl chloride, polyester, polyolefin, nylon, or combinations thereof. The transition strip 30 may also include recycle material, such as post industrial or post consumer scrap. The transition strip 30 may be rigid or flexible and is preferably moisture resistant or waterproof. Additionally, the transition strip 30 may be capable of being delivered or shipped in a roll. In the illustrated embodiment, the transition strip 30 comprises a single layer of rigid black polyvinyl chloride film. Alternatively, the transition strip 30 could comprise multiple layers, such as two layers of film laminated with a mat, such as a glass mat or polyethylene terephthalate mat, there between. The transition strip 30 could also be provided with at least one of a continuous or discontinuous ink layer, antimicrobial layer, sound deadening layer, cushioning layer, slide resistant layer, stiffening layer, channeling layer, mechanically embossed texture, or chemical texture.

Figure 12:
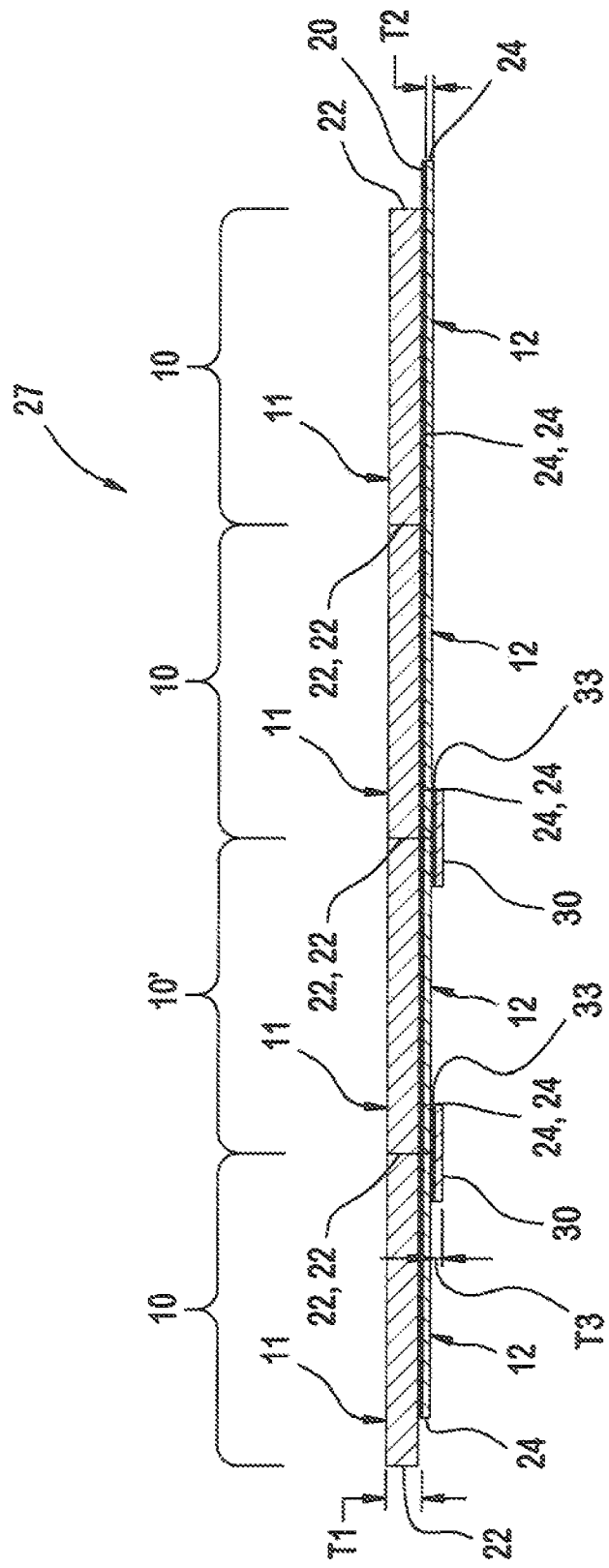
FIG. 12 is a sectional view taken along line 12-12 of FIG. 11.

As shown in FIG. 12, the transition strip 30 has a thickness T3, for example, of about 1-60 mils (about 0.0254-1.524 millimeters), preferably about 6.5-12 mils (about 0.1651-0.3048 millimeters), and more preferably about 8 mils (about 0.2032 millimeters). A ratio of the thickness T1 of the top layer 11 of the floor panel 10 to the thickness T3 of the transition strip 30 is about 5 or greater, preferably about 10-100, and more preferably about 10-25. The transition strip 30 has a length L3 at least as long as the length L1 of the top layer 11 of the floor panel 10 and a width W3 of up to about half the width W2 of the bottom layer 12. It will be appreciated by those skilled in the art that the geometrical shape and the length L3 and the width W3 of the transition strip 30 may be varied depending on the desired method for packaging and/or the form in which the transition strip 30 is to be provided and/or the desired pattern of the floor panels 10.

As shown in FIG. 4, the transition strip 30 has a top side 31 and a bottom side 32. The top side 31 is provided with an adhesive 33. The adhesive 33 may be, for example, any suitable adhesive, such as a hot melt adhesive, a pressure sensitive adhesive, or a structural and/or reactive adhesive. In the illustrated embodiment, the adhesive 33 is a pressure sensitive acrylic adhesive. The adhesive 33 may have, for example, a bond strength of at least 25 force-pounds, and more preferably about 25-30 force-pounds after having been heat aged for about 24 hours at 145 degrees Fahrenheit. In the illustrated embodiment, the adhesive 33 is provided on substantially an entirety of the top side 31.

A release strip 34 is positioned adjacent to the top side 31 to cover the adhesive 33 during shipping and prior to the use thereof. In the illustrated embodiment, the release strip 34 is a flexible sheet corresponding in size and shape to the top side 31. It will be appreciated by those skilled in the art, however, that the size and shape of the release strip 31 may be varied, as long as the release strip 31 adequately covers the adhesive 33. The release strip 34 may be made, for example, from any known suitable release material, such as a poly or silicone coated paper, a plastic sheet, a polymer film, or other material that enables the release strip 34 to be quickly and easily removed from the adhesive 33 during the installation of the floor panels 10. It will be appreciated by those skilled in the art that the release strip 34 could optional be omitted, particularly if the transition strip 30 is delivered or shipped in a roll.

FIG. 6 shows a mixed media floating floor system 35 having a varied pattern of installation of the floor panels 10 and at least one of the floor structures 36 having a composition and/or geometrical configuration different from the floor panels 10. In the illustrated embodiment, the floor structure 36 is a resilient floor tile. In the mixed media floating floor system 35, the floor panels 10 are installed in the same way as the floor panels 10 in the floating floor system 27, except that the transition strip 30 is additionally provided on at least a portion of the attachment surface 26 of the top layer 11 of the floor panels 10 arranged adjacent to the floor structure 36 in order to additionally join the floor structure 36 to the floor panels 10. Although not required, it is preferred that the transition strip 30 chosen to be provided on the floor panels 10 is the same material as and has the same thickness T3 as the bottom layer 12 of the floor panel 10.

As shown in FIG. 5, in order to provide the transition strip 30 on the floor panel 10, the transition strip 30 is cut to a desired size and shape. The release strip 34 is removed from the transition strip 30. The transition strip 30 is adhered to at least a portion of the attachment surface 26 of the top layer 11 with the adhesive 33 provided on the transition strip 30. The transition strip 30 is adhered to the attachment surface 26 of the top layer 11 such that about 1 inch (2.54 centimeters) of the transition strip 30 extends from the first ends 21 and the second ends 22 of the top layer 11. The portions of the transition strip 30 that extend from the first ends 21 and the second ends 22 of the top layer 11 form a floor structure attachment surface 37. As shown in FIG. 6, the floor structure 36 is adhered to the adhesive 33 on the floor structure attachment surface 37 of the transition strip 30 by engaging at least a portion of a bottom surface of the floor structure 36 with the floor structure attachment surface 37.

Figure 7:
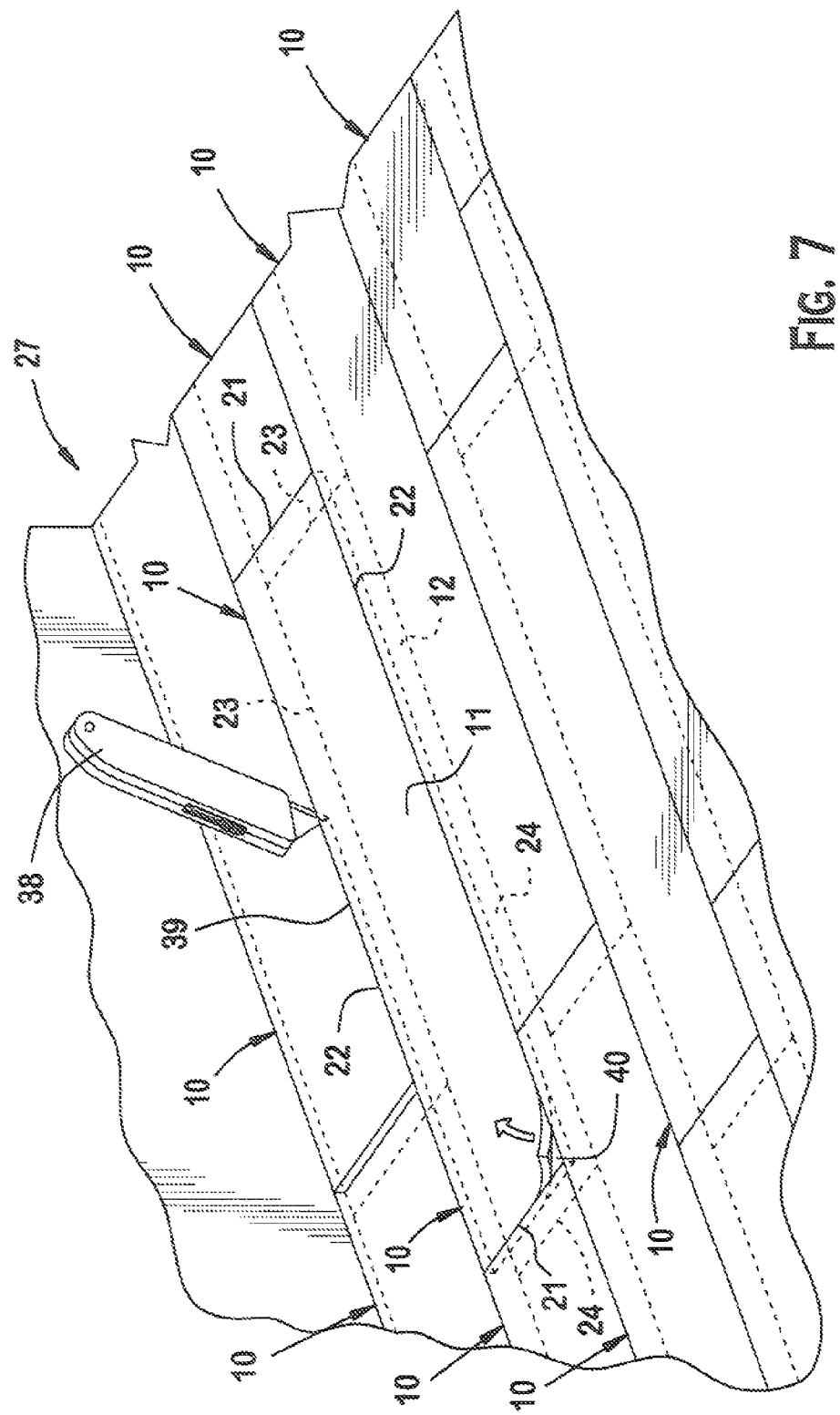
FIG. 7 is a schematic illustration of a method of removing one of the floor panels from the floating floor system of FIG. 2.

FIGS. 7-11 show a method of replacing one of the floor panels 10 in the floating floor system 27 of FIG. 2 using the transition strip 30. Although not shown or described herein, it will be appreciated by those skilled in the art, that the transition strip 30 could also be used to replace one of the floor panels 10 in the mixed media floating floor system 35 of FIG. 6. As shown in FIG. 7, after identifying one of the floor panels 10 which needs replaced, a cutting mechanism 38, such as a knife, is inserted into a seam 39 adjacent the floor panel 10. The cutting mechanism 38 is guided about the perimeter of the top layer 11 via the seam 39. As the cutting mechanism 38 is guided about the perimeter of the top layer 11, the cutting mechanism cuts through the bottom layer 12 of the floor panel 10. The floor panel 10 is then pried up and removed from the floating floor system 27 creating an opening 40 in the floating floor system 27. Because the bottom layer 12 is cut in a position corresponding to the perimeter of the top layer 11, a portion of the bottom layer 12 remains underneath the adjacent floor panels 10 when the floor panel 10 is removed from the floating floor system 27.

Figure 8:
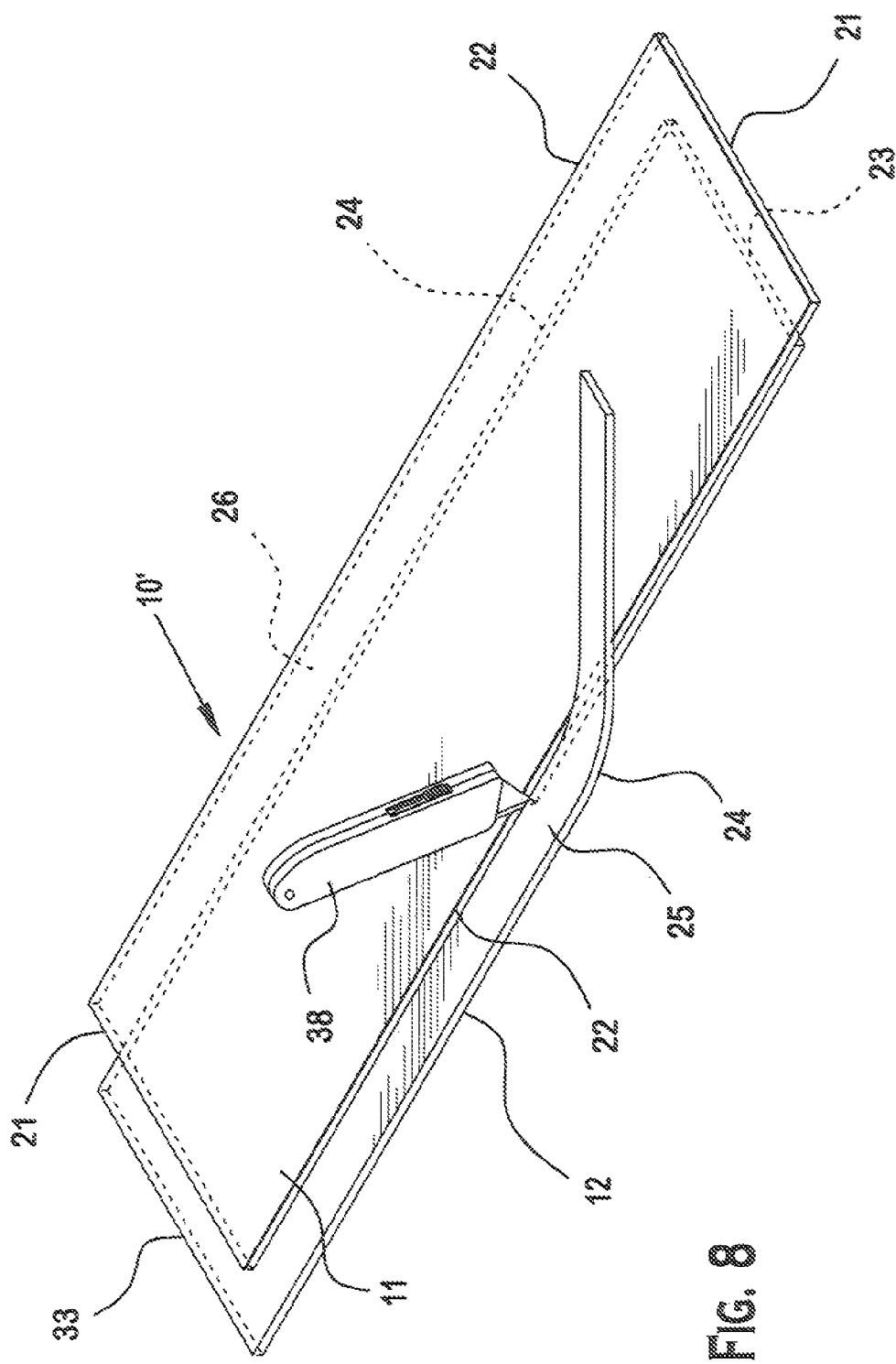
FIG. 8 is a schematic illustration of a method of preparing a replacement floor panel.
Figure 9:
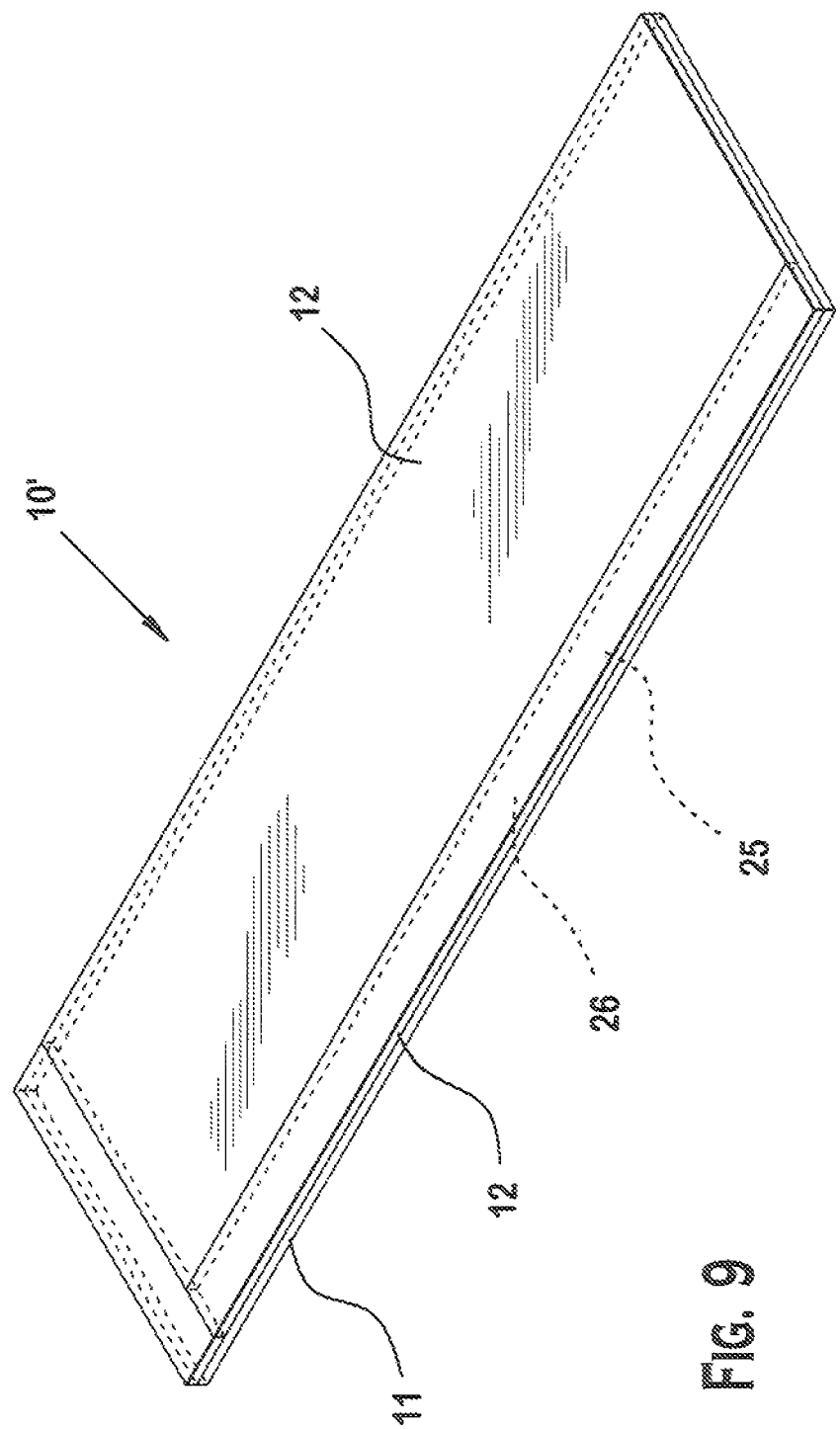
FIG. 9 is a further schematic illustration of a method of preparing the replacement floor panel.

As shown in FIG. 8, a replacement floor panel 10' is prepared for insertion into the opening 40. Although not required, it is preferred that the floor panel 10' chosen to be provided in the opening 40 is the same structure as and has the same thickness as the remainder of the floor panels 10 the floating floor system 27. First, the substantially L-shaped marginal end portion of the bottom layer 12 of the floor panel 10' is removed by guiding the cutting mechanism 38 along the first ends 21 and the second ends 22 of the top layer 11. As shown in FIG. 9, the substantially L-shaped marginal end portion of the bottom layer 12 that has been removed from the floor plank 10' is then adhered to the substantially L-shaped marginal end portion of the bottom surface 15 of the top layer 11 via the adhesive surface 25 on the top surface 18 of the substantially L-shaped marginal end portion of the bottom layer 12. As a result, the bottom surface 15 of the top layer 11 is completely covered with the bottom layer 12 so that the floor panel 10' has a substantially uniform thickness. Additionally, the floor panel 10' no longer has any exposed marginal end portions.

Figure 10:
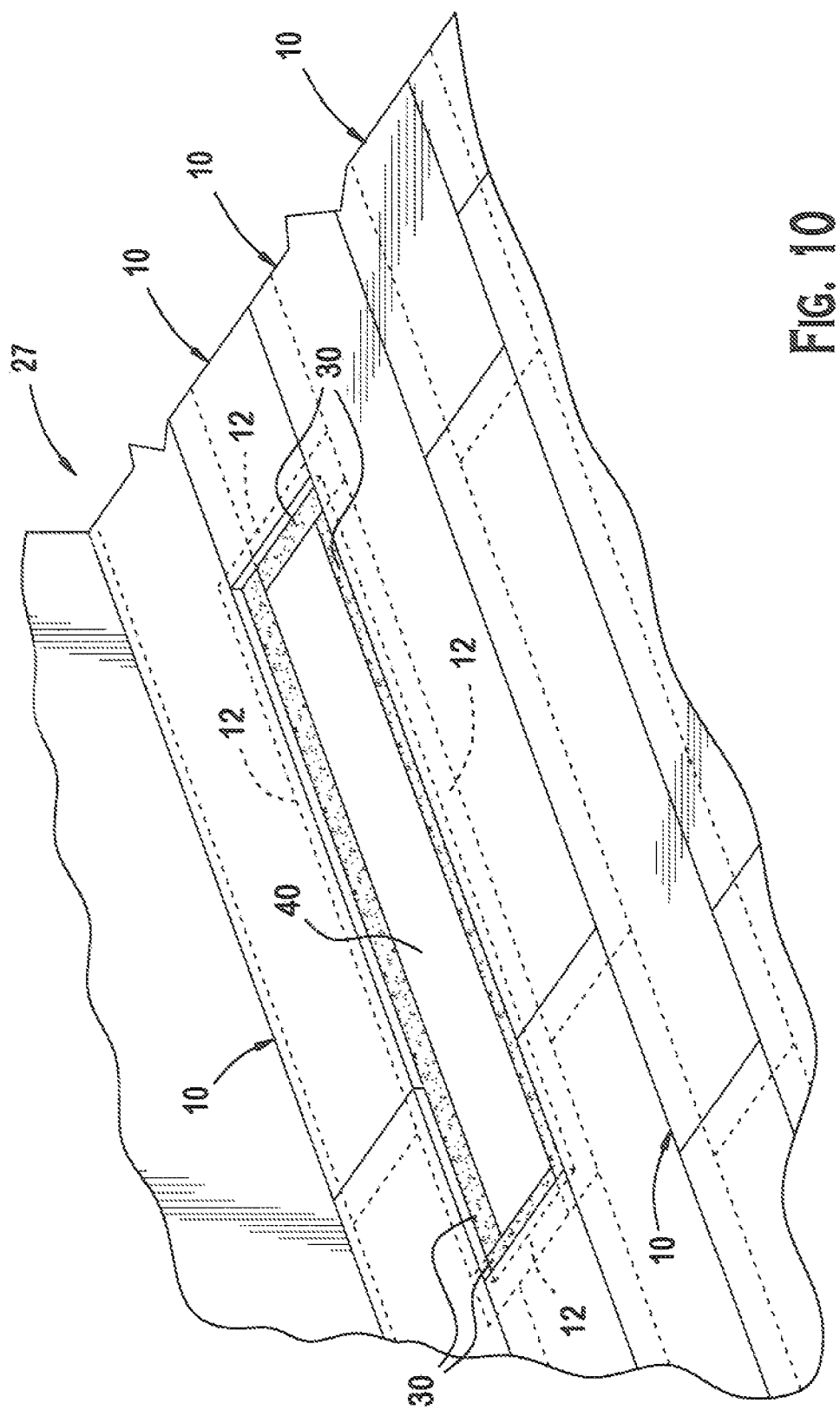
FIG. 10 is a schematic illustration of a method of providing the transition strip in an opening in the floating floor system.
Figure 11:
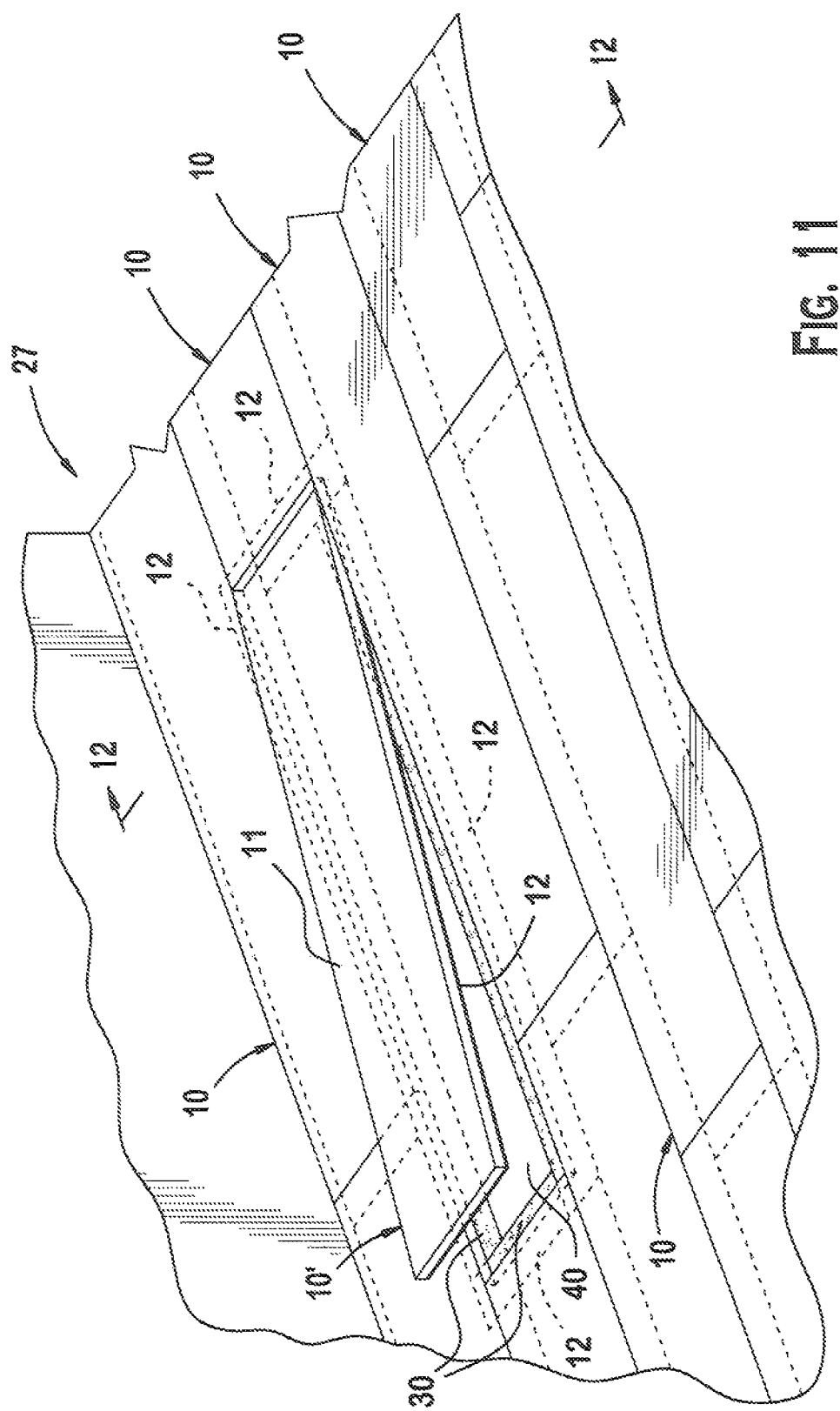
FIG. 11 is a schematic illustration of a method of fixing the replacement floor panel in the opening in the floating floor system.

As shown in FIG. 10, the opening 40 is then prepared for receipt of the floor panel 10' by providing the transition strip 30 therein. Although not required, it is preferred that the transition strip 30 chosen to be provided in the opening 40 is the same material as and has the same thickness T3 as the bottom layer 12 of the floor panels 10 and/or the floor panel 10'. First, the transition strip 30 is cut into individual strips corresponding to the size and shape of the perimeter of the opening 40. The release strip 34 is removed from each of the transition strips 30. The transition strips 30 are then arranged within the opening such that a portion of each of the transition strips 30 is inserted underneath the bottom layers 12 of the adjacent floor panels 10, as shown in FIG. 12. The adhesive 33 of the top side 31 of the transition strips 30 adheres the transition strips 30 to the bottom surface 19 of the bottom layer 12 of the adjacent floor panels 10. The transition strips 30 are adhered to the bottom surface 19 of the bottom layer 12 such that about 1 inch (2.54 centimeters) of the transition strip 30 extends back into the opening 40. As shown in FIGS. 11-12, the floor panel 10' is then positioned in the opening 40 such that the bottom surface 19 of the bottom layer 12 of the floor panel 10' adheres to the adhesive 33 on the transition strips 30.

Because the thickness T2 of the bottom layer 12 of the floor panels 10, 10' and the thickness T3 of the transition strip 30 is significantly less than the thickness T1 of the top layer 11, when the transition strip 30 is caused to overlap with the base layer 12 of the floor panels 10, 10', the overlap will not impact the aesthetic and/or structural characteristics of the top layer 11. Therefore, by reducing the thickness of the bottom layer 12 and/or the transition strip 30, buckling at the top surface 18 of the top layer 11 can be prevented. Additionally, because the thickness 13 of the transition strip 30 is relatively small, it is easy to supply the transition strip 30 in the packaging containing the floor panels 10 rather than having to supply the transition strip 30 separate from the floor panels 10.

The transition strips 30 may also be used to repair the floor panel 10, prior to installation, for example, if a portion of the bottom layer 12 of the floor panel 10 is damaged, creased, and/or wrinkled during shipping. In this instance, the affected area of the bottom layer 12 and a portion of the bottom layer 12 adhered to the bottom surface 15 of the top layer 11 is removed from the floor panel 10 using the cutting mechanism 38. The transition strip 30 is then cut to a size and shape corresponding to the removed area of the bottom layer 12. The release strip 34 is removed from the transition strip 30. The transition strip 30 is then adhered to the bottom surface 15 of the top layer 11 with the adhesive 33 in the area corresponding to the removed area of the bottom layer 12.

The foregoing illustrates some of the possibilities for practicing the invention. Many other embodiments are possible within the scope and spirit of the invention. For example, it will be appreciated by those skilled in the art that the use of the transition strip 30 is not necessarily limited to the floor panel 10 shown and described herein. Specifically, the transition strip 30 could also be used to replace a floor panel in a floating floor system comprised of a plurality of the floor panels of the prior art using the method of replacement previously shown and described herein. As previously described above, in the floor panel of the prior art the bottom layer typically comprises at least one mix layer and has a thickness about equal to or greater than the top layer wherein a ratio of a thickness of the top layer to a thickness of the bottom layer is typically in the range of about 2 or less. Because the thickness T3 of the transition strip 30 is significantly less than the thickness of the top layer and/or the bottom layer of the floor panel of the prior art, when the transition strip 30 is caused to overlap with the bottom layer, the overlap will not impact the aesthetic and/or structural characteristics of the top layer. Therefore, by using the transition strip 30, buckling at the top surface of the top layer can be prevented, and the additional step of carving out the portion of the bottom layer remaining under the adjacent floor panel can be eliminated. It is, therefore, intended that the foregoing description be regarded as illustrative rather than limiting, and that the scope of the invention is given by the appended claims together with their full range of equivalents.

What is claimed is:

1. A transition strip for installing, replacing, or repairing a floor panel in a floating floor system, comprising a film or tape comprising plastic, vinyl, polyvinyl chloride, polyester, polyolefin, or nylon, the transition strip having a thickness of about 6.5-12 mils, the transition strip having a top side and a bottom side, the top side provided with an adhesive and the bottom side free of adhesive; the transition strip further comprises a release member adjacent to the adhesive, wherein the transition strip is configured for positioning between the floor panel and a subfloor of the floating floor system, and the top side of the transition strip is configured to adhere to the bottom surface of the floor panel upon removal of the release member.

2. The transition strip of claim 1, wherein the transition strip is a moisture resistant film.

3. The transition strip of claim 1, wherein the transition strip includes at least one of a continuous or discontinuous ink layer, antimicrobial layer, sound deadening layer, cushioning layer, slide resistant layer, stiffening layer, channeling layer, mechanically embossed texture, or chemical texture.

4. The transition strip of claim 3, wherein the adhesive is a pressure sensitive acrylic adhesive.

5. The transition strip of claim 1, wherein the transition strip has a thickness of about 8 mils.

6. A transition strip for installing, replacing, or repairing a floor panel in a floating floor system, comprising a film or tape comprising plastic, vinyl, polyvinyl chloride, polyester, polyolefin, or nylon, the transition strip having a thickness of about 6.5-12 mils, the transition strip having a top side and a bottom side, the top side provided with an adhesive and the bottom side free of adhesive, wherein the transition strip is configured for positioning between the floor panel and a subfloor of the floating floor system, and the top side of the transition strip is configured to adhere to the bottom surface of the floor panel.

7. The transition strip of claim 6, wherein the transition strip includes at least one of a continuous or discontinuous ink layer, antimicrobial layer, sound deadening layer, cushioning layer, slide resistant layer, stiffening layer, channeling layer, mechanically embossed texture, or chemical texture.

8. The transition strip of claim 7, wherein the adhesive is a pressure sensitive acrylic adhesive.

9. A transition strip for installing, replacing, or repairing a floor panel in a floating floor system, comprising a film or tape comprising plastic, vinyl, polyvinyl chloride, polyester, polyolefin, or nylon, the transition strip having a thickness of about 6.5-12 mils, the transition strip having a top side and a bottom side, the top side provided with an adhesive, wherein the transition strip is configured for positioning between the floor panel and a subfloor of the floating floor system, and the top side of the transition strip is configured to adhere to the bottom surface of the floor panel, wherein the transition strip further comprises a release member adjacent the adhesive.

10. The transition strip of claim 9, wherein the transition strip has a thickness of about 8 mils.

* * * * *